Dec. 26, 1939.  F. B. EMBURY  2,184,273
HOLDING MEANS FOR FLARES AND THE LIKE
Filed Feb. 5, 1938  2 Sheets-Sheet 1
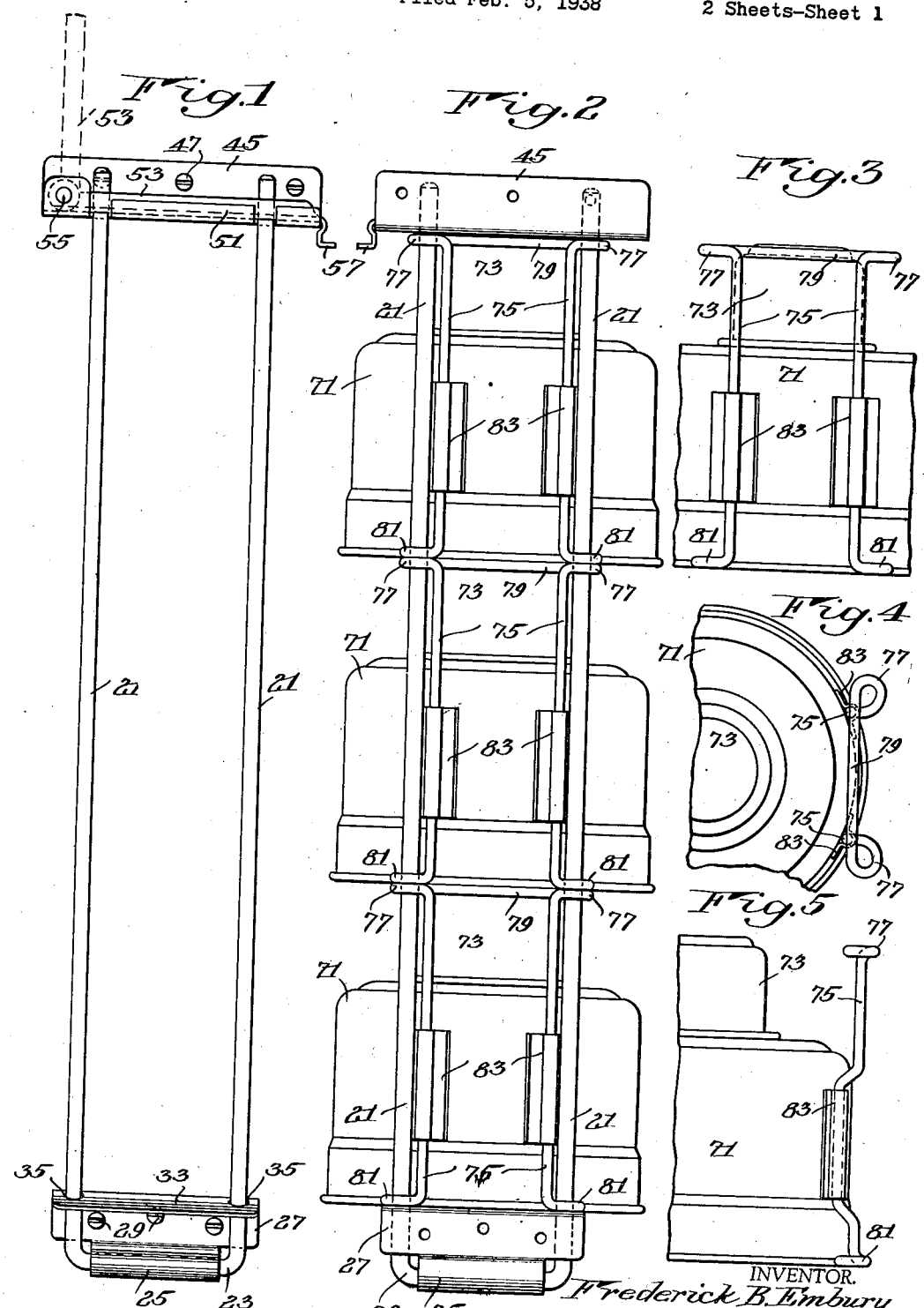
INVENTOR.
Frederick B. Embury
BY Cumpston & Shepard
his ATTORNEYS Dec. 26, 1939.                     F. B. EMBURY                          2,184,273
                        HOLDING MEANS FOR FLARES AND THE LIKE
                               Filed Feb. 5, 1938              2 Sheets-Sheet 2
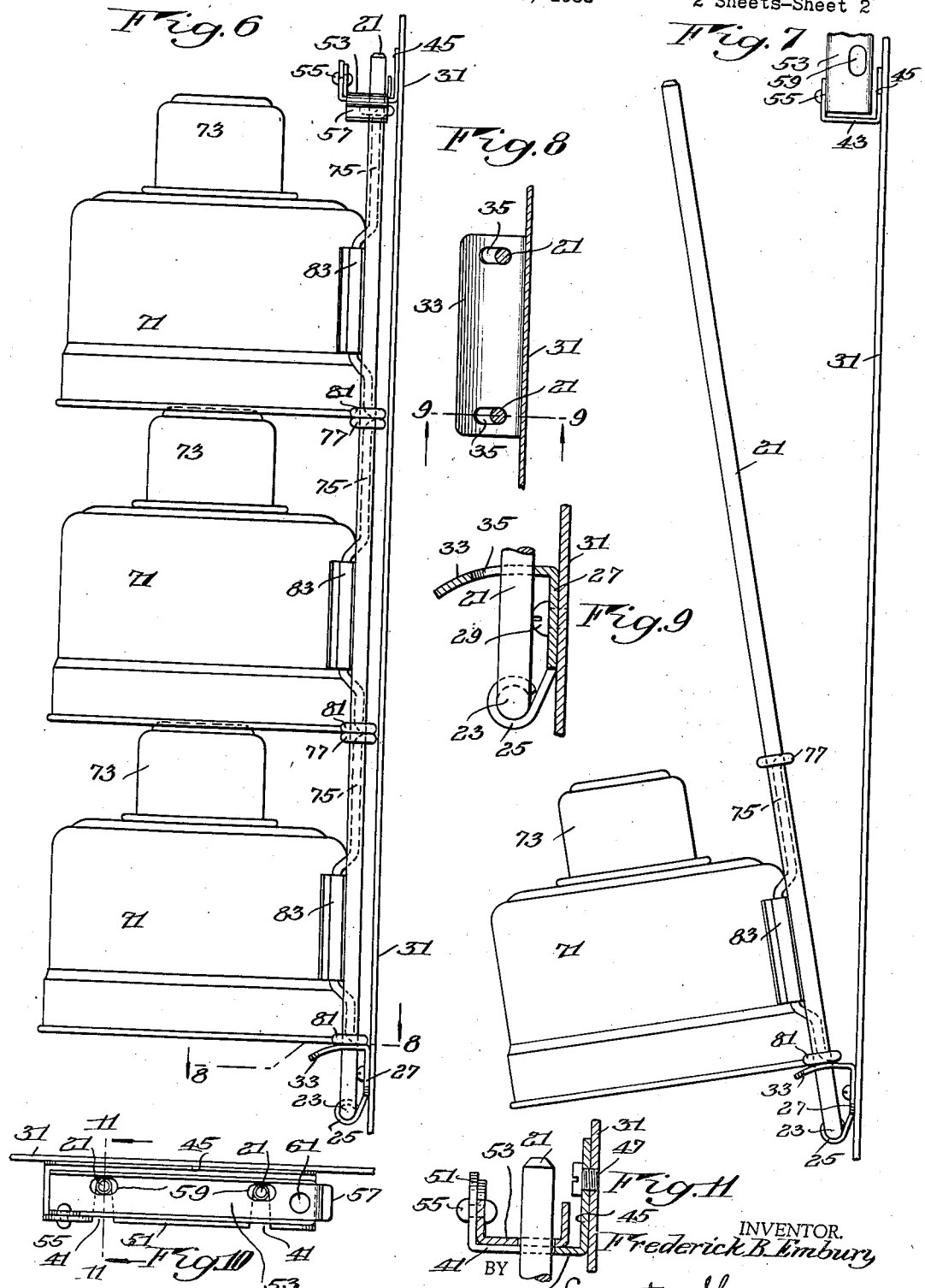
INVENTOR.
Frederick B. Embury
BY Cumpston & Shepard
his ATTORNEYS Patented Dec. 26, 1939

2,184,273

UNITED STATES PATENT OFFICE 2,184,273

HOLDING MEANS FOR FLARES AND THE LIKE

Frederick B. Embury, Warsaw, N. Y., assignor to Embury Manufacturing Company, Warsaw, N. Y., a corporation of New York Application February 5, 1938, Serial No. 188,959

5 Claims. (Cl. 211—59)

The present invention relates to means for holding various articles, such as flares, when they are not in use.

An object of the invention is the provision of holding means so designed as to hold the flares securely when not in use, preventing accidental displacement thereof, and yet permitting the flares to be removed easily and quickly when needed for use.

Another object is the provision of holding means so designed that it may be quickly applied to any suitable supporting surface, such as the wall of a truck body.

Still another object is the provision of holding means so designed that the flares may be securely locked in place against theft.

A further object is the provision of holding means and flares so designed in cooperative relation to each other that when a plurality of flares are held by the holding means, the weight of the upper flares does not cause them to rub in an undesirable manner upon or otherwise damage the lower flares, and so designed that the flares can be both removed from and replaced on the holding means with great ease and speed.

To these and other ends the invention resides in certain improvements and combinations of parts, all as will be hereinafter more fully described, the novel features being pointed out in the claims at the end of the specification.

In the drawings:

Fig. 1 is a front view of holding means constructed in accordance with a preferred embodiment of the invention, with the flares removed therefrom;

Fig. 2 is a rear view of the same with a set of flares in place thereon;

Fig. 3 is a fragmentary rear view of a flare so designed as to cooperate with the holding means;

Fig. 4 is a fragmentary top view of the same;

Fig. 5 is a fragmentary side view of the same;

Fig. 6 is a side view of the holding means and a set of flares held thereon, the parts being in normal holding position;

Fig. 7 is a similar view with the holding means moved to open position for removing or replacing the flares, and with two of the flares removed therefrom;

Fig. 8 is a horizontal section taken substantially on the line 8—8 of Fig. 6;

Fig. 9 is a vertical section taken centrally on the line 9—9 of Fig. 8;

Fig. 10 is a plan view of the upper end of the holding means, and

Fig. 11 is a vertical section taken substantially on the line 11—11 of Fig. 10.

The same reference numerals throughout the several views indicate the same parts.

It is desirable that trucks and other vehicles carry flares so that if a vehicle becomes disabled while traveling at night, the flares can be lit and set at appropriate distances from the disabled vehicle, to warn approaching motorists of the obstruction. For maximum safety protection, the flares should be set out speedily after the disabled vehicle comes to rest. If the flares are quickly and easily available to the operator of the disabled vehicle, he is encouraged thereby to set them out quickly, but if the flares are carried by the vehicle in such a manner that they can be removed only with difficulty, the operator is likely to neglect his duty of setting out the flares, particularly if he believes he can remedy the cause of the breakdown in a few minutes and proceed on his way. Hence the ease with which the flares may be removed from their holder and set out for use is a matter of great importance and may have a great bearing on the safety of other motorists during travel at night.

The holding means of the present invention is particularly designed to combine ease and speed of removal of the flares, when required, with adequate and sturdy holding of the flares in normal traveling position, when they are not required for use. In the form of construction shown in the drawings as an illustrative example of the present invention, the holding means comprises a generally U-shaped device formed of two side rods 21 connected to each other integrally by a cross bar 23 at the bottom. The side arms 21 and bottom 23 may all be made from a single metal rod suitably bent.

The bottom portion or cross member 23 of this U-shaped frame is pivoted in a bearing formed by a metal flange 25 bent loosely around the rod 23 (Fig. 9), which flange 25 is part of a lower supporting bracket 27 secured, as by means of rivets, nails, or screws 29, to any suitable supporting surface indicated diagrammatically at 31. The supporting surface may be the side wall of a truck body or trailer body, for example.

The supporting bracket 27 has at its upper edge an outwardly extending flange 33 (Figs. 8 and 9) provided with elongated slots 35 through which the rods 21 extend upwardly. The slots 35, being at some distance above the pivot axis 23, serve to limit the extent to which the rods 21 may swing outwardly away from the surface 31. The lengths of the slots are such that the upstanding rods 21 may be swung inwardly to a position approximately parallel to the supporting surface 31, as shown in Fig. 6, or may be swung outwardly away from the supporting surface 31 at their upper ends to approximately some such inclination as that indicated in Fig. 7, further outward swinging of the rods being prevented by contact of the rods with the outer ends of the slots 35.

The rods 21 are substantially straight and parallel to each other. When they are swung into their normal position approximately parallel to the supporting surface 31, the upper ends of the rods are received in slots 41 (Figs. 10 and 11) extending inwardly from the outer edge of a horizontal flange 43 formed on an upper bracket 45 secured to the supporting surface 31 by suitable means, such as rivets, nails, or screws 47. The upper bracket 45 is secured to the supporting surface 31 at an appropriate distance from the bottom bracket 27 so that the upper ends of the rods 21 will extend to an elevation slightly above the flange 41 of the upper bracket, as illustrated in Figs. 1, 2, 6 and 11.

The flange 43 of the upper bracket 45 is bent upwardly at its outer or front edge, as indicated at 51. The slots 41 extend through the flange 51 as well as the flange 43, so that the rods 21 may swing outwardly away from the supporting surface 31 through the slots, or may swing backwardly through the slots to the rear ends thereof.

To hold the rods 21 in the slots 41, latch means is provided, such as the latch member 53, of somewhat U-shaped cross section, as shown in Fig. 11, the front wall of the member 53 being pivoted to the bracket flange 51 by a pivot 55 near one end of the bracket and latch member. The opposite end of the latch member is bent downwardly as at 57 (Fig. 1) and is so shaped as to form a spring detent engaging the adjacent end of the flange 43 of the bracket. Intermediate its length, the latch member 53 has slots 59 (Fig. 10) in line with the rods 21, the slots being elongated in a direction substantially parallel to the supporting surface 31, so that the ends of the slots will clear the upper ends of the rods when the latch is opened or closed. When the rods are in normal traveling position, as shown in Figs. 6, 10, and 11, the upper ends of the rods lie in the slots 41 of the upper bracket, and the latch 53 lies close against the flange 43 of the upper bracket, the rods projecting through the slots 59 in the latch 53 and being held by this latch against outward swinging movement away from the surface 31. The latch, in turn, is held in latching position by its resilient end 57 tightly engaging the corresponding end of the fixed flange 43. It is but the work of a moment, however, to press upwardly on the end 57 of the latch, in an oblique direction away from the pivot 55, and this will spring the latch past the end of the flange 43 and enable it to be swung upwardly about its pivot 55 until it clears the top ends of the rods 21, the open position of the latch being illustrated in dotted lines in Fig. 1. When the latch has thus been opened the rods 21 are free to swing outwardly through the open ends of the slots 41, and away from the supporting surface 31 to the extent permitted by the lengths of the slots 35 in the lower bracket 27.

If it is desired to provide a lock on the latch to prevent unauthorized opening of the latch, this may be done by placing the bow of a padlock through alined holes 61 (Fig. 10) in the latch 53 and the flange 43.

The flares to be held by the holding means may be of any suitable known construction, except for the special features specifically described below. For instance, the flares may each comprise a main body 71 constituting a container for holding fuel such as oil, the body being surmounted by a removable cap 73 within which is a wick or other burner device which may be lighted when the cap is removed.

Secured to or formed as part of each flare body 71 is suitable means forming eyes or loops to be impaled on the rods 21. In the preferred form here shown, these eyes are formed by wires or small rods 75 rigidly secured in upright position to the sides of the flare bodies 71, the wires being bent laterally at elevations substantially level with the top of the cap 73, as shown at 77, and formed into loops (Fig. 4), the wire then extending approximately horizontally from one loop 77 to the other, as shown at 79.

These upright wires 75, near the bottom of the body 71, are also bent laterally to form loops 81 similar to the loops 77, the wires preferably terminating after completing these loops. The upright portions 75 of the wires are securely held to the flare body 71 by any suitable means, such as welding reenforced if desired by plates 83 overlying parts of the wires 75 and welded to the wires and to the body 71.

The two loops or eyes 77 are spaced from each other center to center the same distance as the center to center spacing of the two parallel holding rods 21, and the same is true of the two eyes 81. The eyes are sufficiently offset laterally from all parts of the flare body 71 so that the rods 21 may extend through the eyes without interfering with other parts of the flare body. Thus the flares may be impaled on the rods 21 by moving each flare downwardly onto the free top ends of the rods 21 when the rods are swung to open position, the rods first passing through the two lower loops 81 and then through the two upper loops 77 of each flare as the flare is moved downwardly onto the rods.

The rods may be of the proper length to hold any desired number of flares. Three flares are usually carried, and in the present illustrative example the rods are shown of proper length to accommodate three flares.

When the flares are in place on the holding rods, the loops 81 at the bottom of the lower flare rest on the top of the bracket plate 33. Preferably this bracket plate 33 is curved downwardly in an outward direction, as shown in Figs. 6, 7, and 9, so the loops 81 resting thereon will slide smoothly over the plate when the rods 21 are tilted outwardly from closed or latched position to open position.

The second flare is placed on the rods above the bottom flare, and the loops 81 at the bottom of the second flare rest on top of the loops 77 at the top of the lower flare. The elevation of these loops with respect to the flare bodies is such that the bottom wall of the second flare is held just above and out of contact with the top of the cap 73 on the bottom flare. The same is true of the third or top flare. Thus the weight of the higher flares does not rest upon the cap 73 or other parts of the bodies of the lower flares, but is taken entirely by the wire frames 75 and loops 77 and 81, which are the only parts of the respective flares which contact with each other when the flares are in normal position for travel. Any jolting or jarring of the flares thus does not scrape the top of the cap 73 of one flare against the bottom of the body of the next higher flare, and this avoids scratching or otherwise marring the flares as well as any possibility that continued jarring would wear a hole in the bottom of an upper flare and cause the liquid fuel to leak therefrom.

The height of the upper bracket 43 above the lower bracket plate 33 is preferably such that when the desired number of flares are in place on the rod 21 and the rod is moved back to its vertical or traveling position, the upper loops 77 on the uppermost flare will just fit snugly beneath the plate 43 of the upper bracket, which bracket will thus hold the flares against upward jolting or jarring during travel of the vehicle.

In use, the required number of flares are placed on the rods 21 and the latch 53 is swung downwardly so that the upper ends of the rods extend through the slots 59 in the latch, and are held thereby against outward movement to open position. The latch 53 is securely held in place against accidental opening by means of the resilient detent 57, but if further security is desired, a padlock may be applied through the holes 61.

When the vehicle carrying this assembly of flares is disabled at night, it is but the work of a moment for the operator to swing the latch 53 upwardly (first unlocking the padlock if one has been used) and this immediately releases the upper ends of the rods 21 so that they may be swung outwardly to the position shown in Fig. 7. The flares are then simply lifted upwardly, sliding readily upwardly along the rods 21 until the lower loops 81 of each flare come off the ends of the rods. The flares are then placed at the proper distance from the vehicle and lit, in the usual manner.

When the vehicle is ready to proceed on its way, the flares are extinguished and put back on the rods 21 by a downward motion, and the rods are then swung back into the slots 41 and the latch 53 swung downwardly to hold the rods in normal traveling position. If the flare bodies become hot during use so that it is difficult to touch them, the upwardly extending ends of the wires 75 will be found to cool off quickly, and can be used as convenient handles by which to lift the flares to carry them back to the vehicle when they have been extinguished and to place them in traveling position on the holding rods 21.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Means for holding a flare having two laterally spaced eyes, said holding means including two upstanding rods substantially parallel to each other and spaced from each other by a distance corresponding substantially to the lateral spacing of said eyes, a transverse rod connecting said two upstanding rods to each other adjacent their lower ends, mounting means encircling said transverse rod and forming a bearing in which said transverse rod may rotate so that said upstanding rods may swing with said transverse rod, and releasable latching means for holding the upper ends of said upstanding rods in substantially fixed position, said upper ends when released from said latching means being swingable to a position in which a flare may be impaled on said rods by downward movement onto the free upper ends thereof or may be removed therefrom by a reverse movement.

2. A construction as described in claim 1, further including means adjacent the lower ends of said upstanding rods for limiting the extent to which said rods may swing away from latched position.

3. Means for holding a flare having two laterally spaced eyes, said holding means including two upstanding rods substantially parallel to each other and spaced from each other by a distance corresponding substantially to the lateral spacing of said eyes, a transverse rod connecting said two upstanding rods to each other adjacent their lower ends, mounting means encircling said transverse rod and forming a bearing in which said transverse rod may rotate so that said upstanding rods may swing with said transverse rod, a flange secured to said mounting means and extending transversely to said upstanding rods above said bearing and having openings substantially larger than said rods in the direction of movement of said rods and through which said rods pass, said openings limiting swinging movement of said rods in one direction, and releasable latching means cooperating with said upstanding rods near their upper ends to hold them in substantially fixed position, said upstanding rods when released from said latching means being swingable from said fixed position to the extent permitted by said openings, to a position in which said eyes of a flare may readily be moved downwardly onto or moved upwardly off of the upper ends of said upstanding rods.

4. A construction as described in claim 1, in which said releasable latching means includes a flange extending transversely to said upstanding rods near their upper ends and having slots alined with said upstanding rods and extending in the directions of movement of said rods when said rods are swung in said bearing, said slots having open outer ends so that said rods may swing freely into and out of said slots, and retaining means movable with respect to said flange between an effective latching position retaining said upstanding rods in said slots and an ineffective unlatching position out of the path of movement of said rods.

5. Means for holding a flare having two laterally spaced eyes, said holding means including two upstanding rods substantially parallel to each other and spaced from each other by a distance corresponding substantially to the lateral spacing of said eyes, the spacing means comprising a transverse rod connecting said two upstanding rods to each other adjacent their lower ends, mounting means encircling said transverse rod and forming a bearing in which said transverse rod may rotate so that said upstanding rods may swing with said transverse rod, a flange secured to said mounting means and extending transversely to said upstanding rods above said bearing and having openings through which said rods pass, said openings being substantially larger than said rods in the direction of movement of said rods and limiting swinging movement of said rods in one direction, a bracket including a second flange extending transversely to said upstanding rods near their upper ends and having slots alined with said upstanding rods and extending in the directions of movement of said rods when said rods are swung, said slots having open outer ends so that said rods may swing freely into and out of said slots, and a latch member pivotally mounted on said bracket to swing approximately in the common plane of said upstanding rods, said member being restrained against movement out of said plane and being swingable between an ineffective position out of the paths of swinging movement of said rods and an effective latching position in which a part of said member obstructs swinging movement of said rods out of said slots in said second flange, said rods being swingable when said latch member is in said ineffective position to a position clear of said bracket, in which position the eyes of a flare may readily be moved downwardly onto or upwardly off of the upper ends of said upstanding rods.

FREDERICK B. EMBURY.